324-77 SEARCH ROOM

July 26, 1966 W. R. REMLEY 3,263,169

AUTOMATIC GAIN CONTROL FOR RECIRCULATING LOOP SPECTRUM ANALYZER

Filed Oct. 31, 1962

INVENTOR
WINSLOW R. REMLEY

BY Edward G. Fiorito
AGENT

United States Patent Office 3,263,169

Patented July 26, 1966

3,263,169

AUTOMATIC GAIN CONTROL FOR RECIRCULATING LOOP SPECTRUM ANALYZER

Winslow R. Remley, Bethesda, Md., assignor to International Business Machines Corporation, New York, N.Y., a corporation of New York Filed Oct. 31, 1962, Ser. No. 234,344

6 Claims. (Cl. 324—77)

Figure 1:
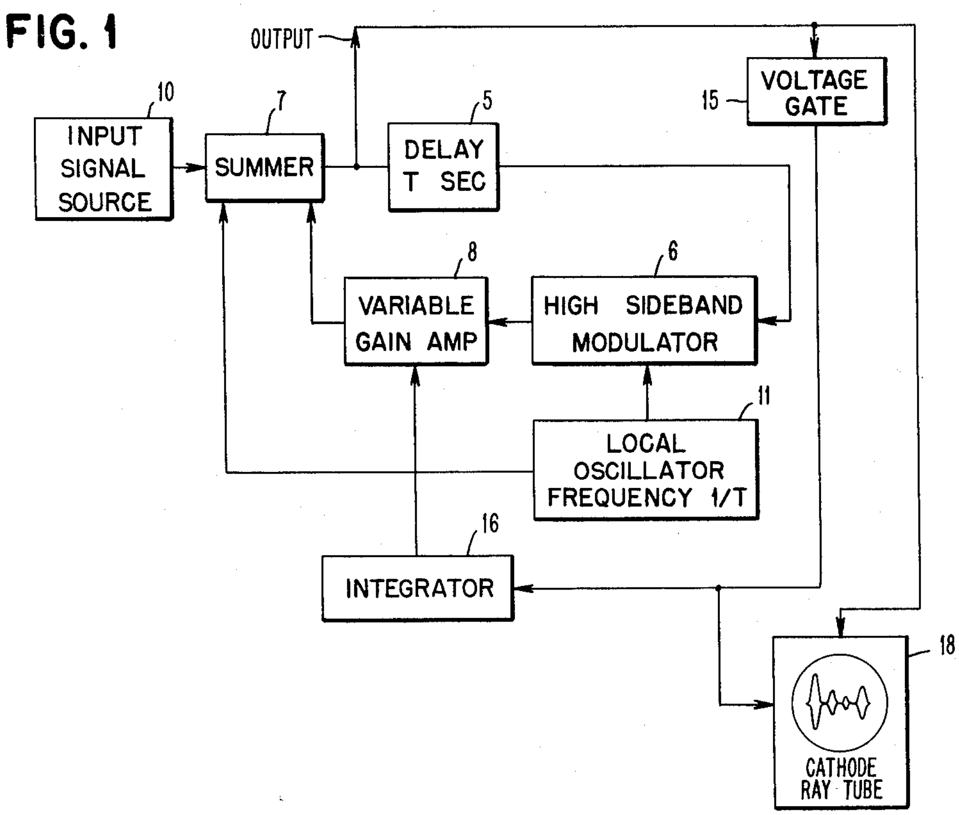

This invention relates to automatic gain control devices and more particularly to such devices especially suited for use in spectrum analysis which employ a circulating electrical loop for repetitive scanning of the signal spectrum.

It is ordinarily desirable to control the gain of the circulating loop employed in spectrum analyzers. For example, a problem occurs where the gain of the loop is greater than unity. Each time the signals in the loop circulate about the loop the amplitude of the signal increases until the components in the loop exceed their capacity and become saturated. One way of avoiding this problem is to reduce the gain of the loop below unity so that each time the signal circulates about the loop it is attenuated and has a diminishing effect upon the loop. However, it has been found that a gain very close to unity enhances the resolution of the spectrum analyzer and hence is a very desirable objective. Therefore, the gain must be controlled very closely in order to approach unity, but yet not exceed this critical value. Frequent corrections in the gain of the circulating loop are necessary in order to compensate for changes in the parameters of the components in the loop brought about by environmental changes such as temperature.

It is frequently desirable to have a variable-gain spectrum analyzer. This is particularly true in echo-ranging systems where the echo may be Doppler shifted. By spectral analyzing the return signals and matching the resolution of the analyzer to the width of the echo returned from the target, optimum processing of the echo can be achieved. Therefore, since the gain of the circulating loop effects the resolution of the spectrum analyzer, it is desirable to provide variable gain and maintain the selected gain with a high degree of accuracy.

An additional and separate problem in controlling the loop gain occurs where the signal under analysis disappears and reoccurs frequently. Here, even though there is no input signal to be analyzed, it is desirable to maintain the gain of the circulating loop constant, the gain control being uninterrupted by the disappearance of the input signal.

It is an object of the present invention to provide an improved automatic gain control circuit.

It is another object of the present invention to provide an automatic gain control circuit for a spectrum analyzer.

It is a further object of the present invention to provide a spectrum analyzer having continuous automatic gain control independent of the signal under analysis.

Briefly, in accordance with the present invention, a strong signal of a known frequency is injected into a circulating loop spectrum analyzer. According to the operation of the circulating loop the injected signal reinforces itself each time it circulates within the loop resulting in a sharp pulse circulating about the loop. The height of this pulse can be made to exceed the height of all other signals in the loop resulting from the spectrum of the input signal applied, by making the injected signal stronger than the frequency components in the input signal spectrum. In this manner a gate circuit may be set to a threshold above all signal components circulating in the loop except the pulse resulting from the injected signal. This gate then provides a series of pulses whose height is dependent upon the gain of the loop and therefore these pulses can be made to control the gain of the loop in response to changes in their height.

An advantage of this method of controlling gain is that the pulse height resulting from the injected signal is examined independently of the signal circulating in the loop resulting from the input signal spectrum under analysis. Therefore the input signal can disappear without interrupting the gain control circuit.

A further advantage of the present invention is that the gain of the loop is sampled once each time the signals circulate about the loop. Thus, the response time of the gain control circuit can be made very short, and can be used to suppress the 60 cycle per second hum originating from the power supply in the ordinary spectrum analyzer.

In accordance with another aspect of the present invention, the frequency of the injected signal is made to equal the reciprocal of the time taken for a signal to circulate the loop. In this manner reinforcement of the injected signal occurs within the loop at the beginning of each cycle of the output signal. Therefore this early pulse can be used to trigger the horizontal sweep of a cathode ray tube in order to display the output signal. Further, since the injected signal is of a known frequency its position in the horizontal sweep on the cathode ray tube can be used to calibrate the tube in order to determine the frequency of other signals in the output of the spectrum analyzer.

An advantage of this latter aspect of the present invention is that the synchronizing pulse and calibrating pulse are generated within the spectrum analyzer from the same loop and in the same manner that the output signal is generated. Therefore, changes in the parameters of the components of the circulating loop have the same effect upon the synchronizing and calibrating pulse as they do on the signals resulting from the input signal spectrum. Since the synchronization and calibration depend upon the relative value, rather than the absolute value of the injected signal and input spectrum signals within the loop, these parameter changes in the loop do not effect the synchronization and calibration achieved by the present invention.

Accordingly, it is a further object of the present invention to provide an improved spectrum analyzer capable of generating a synchronizing signal concomitantly with the output signal.

It is still another object of the present invention to provide an improved spectrum analyzer capable of generating a calibrating signal concomitantly with the output signal.

The foregoing and other objects, features, and advantages of the invention will be apparent from the following more particular description of a preferred embodiment of the invention, as illustrated in the accompanying drawings.

Figure 2:
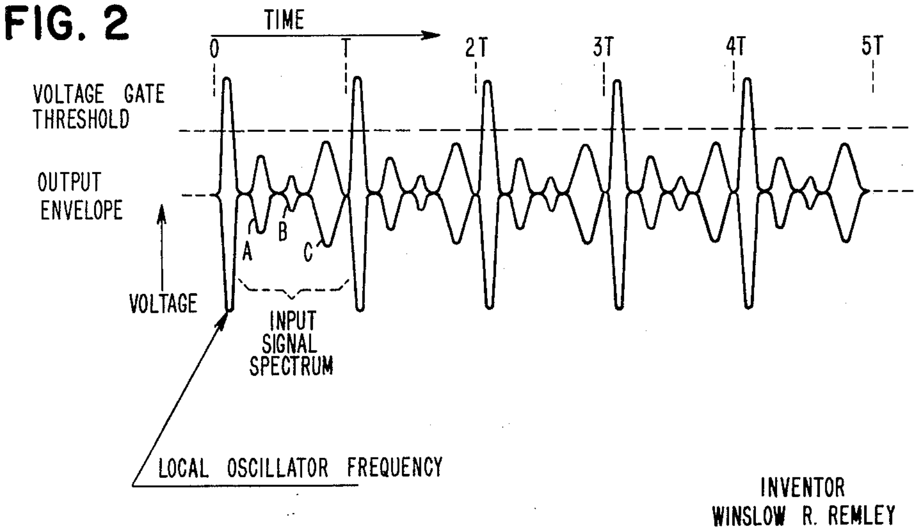

In the drawings:

FIG. 1 is a block diagram of a spectrum analyzer embodying the present invention; and FIG. 2 is a waveform of a typical output signal produced by the spectrum analyzer of FIG. 1.

In order to understand the present invention, it is necessary to have a familiarity with the circulating loop spectrum analyzer. Briefly, the circulating loop includes a delay circuit 5, a high sideband modulator 6 and a summer 7. The variable gain amplifier 8 can be considered to have a gain of unity for the present discussion. As signals circulate about the loops 5–8, they are delayed in time by delay 5 and are shifted in frequency by modulator 6. The modulator 6 compensates for the phase shift introduced by delay 5 so that signals fed back to the summer 7 add in phase for an interval of time with signals applied to the summer 7 by the input signal source 10. Each frequency component in the input signal spectrum adds in phase for an instant with that same component of frequency fed back to the summer 7. This in-phase reinforcement occurs once for each circulation of the frequency component about the loop 5–8. The time at which the reinforcement occurs depends upon the frequency of the signal.

Referring to FIGURE 2, the envelope of a typical signal circulating in the loop is shown. For example, in FIGURE 1, let a signal of frequence $f_A$, amplitude A and arbitrary phase, be applied to the summer 7 by the input source 10. In this case, it can be shown that the square of the envelope of the signal in the loop is $$\frac{A^2}{1+K^2-2K\cos[2\pi(f_AT-t/T)]}$$

where $t$=real time
$f_A$=signal frequency
$A$=the amplitude of the input frequency
$T$=the delay of the delay line 5
$K$=the gain of the loop which is less than unity.

Therefore, a peak response occurs in the output at instants when the phase in the term above exactly equals an even multiple of $2\pi$. This is true whenever $$t=nT+f_AT^2$$
$$n=0, \pm 1, \pm 2, \ldots$$

From this it is clear that the envelope of the output forms a peak every T seconds. The height of the peak response is proportional to the amplitude of the input frequency component. The exact instant at which the response peaks is proportional to the signal frequency. Hence if the range of the input frequencies is limited to be less than $(1/T)$, the output is a repetitive scan (once every T seconds) of the spectrum of the input signal. As a further example, consider three input frequency components $f_A$, $f_B$, $f_C$. If $f_C$ is greater than $f_B$, and $f_B$ is greater than $f_A$, three peaks occur in the output corresponding to the three input frequency components. This situation is shown in FIGURE 2. The instant during the scan that a particular component peaks is linearly proportional to the component frequency. Therefore the pattern of the envelope represents the particular frequency components present in the input signal.

Having described the operation of the loop 5–8 briefly, the gain control of the loop is described below. Variable gain amplifier 8 is placed in series in the loop 5–8. The amplifier 8 may be any conventional amplifier having means for varying the gain, for example by varying the bias on a tube. The local oscillator 11 has a dual function. The first function is to provide the modulator 6 with a signal in order to perform the convention frequency shifting operation of a heterodyning circuit. The local oscillator is selected to be equal to the reciprocal of the time delay T of the delay 5. This selection is necessary to achieve the operation of the loop 5–8 described above. The second function of the local oscillator 11 is to provide the same signal to the summer 7. The oscillator frequency has the same effect upon the loop 5–8 as the frequency components A–C. Therefore, the local oscillator frequency peaks up as it circulates about the loop and forms a pulse response as illustrated in FIG. 2. By applying a signal to the summer 7 from the local oscillator 11 whose amplitude is greater than the amplitude of the frequency component A–C present in the input signal spectrum, the height of the response in the loop 5–8 due to the local oscillator is greater than the height of the responses due to the components A–C.

A voltage gate 15 is connected to the output and is set to pass signals above a predetermined threshold. The voltage gate 15 may be any conventional clipping circuit having a tube biased to conduct when the signal exceeds a certain threshold. FIG. 2 shows the voltage gate threshold as a dashed line below the local oscillator response and above the input signal spectrum response. Therefore, only pulses in the envelope appearing above the threshold pass on to the integrator 16. The integrator 16 smooths out the pulses and provides a level indicative of the height of the pulses above the threshold. The integrator includes conventional capacitor and resistor networks for integrating and averaging signals. The output of the integrator 16 is applied to the variable gain amplifier 8 in a negative manner. That is, as the level of the integrator output increases the gain of the amplifier 8 is decreased. Therefore, if the gain of the loop 5–8 increases causing the pulse response of the local oscillator to increase, the gain of the amplifier 8 is reduced to compensate for the change in gain and restore the loop to the proper setting.

As described above, the voltage gate 15 passes pulses resulting only from the local oscillator 11. Therefore adjustments of the variable gain amplifier 8 are independent of the input signal source 10, and in fact the input signal may disappear without interrupting the gain adjustment.

The 60 cycle per second hum variation in the loop gain caused by the ordinary A.C. power supply may be corrected by selecting a short delay time (T). Where the delay time (T) is small compared to 1/60 second (i.e., one period of the A.C. power supply), adjustment to the gain of amplifier 8 may be made at a rate comparable to the 60 cycle per second hum.

With regard to displaying the output upon the cathode ray tube 18, the local oscillator 11 provides a synchronizing and calibrating pulse in the output. Since the local oscillator frequency is exactly equal to the reciprocal of the time delay T, in-phase addition at the summer 7 takes place at the beginning of each cycle of the local oscillator. All other frequency components from the input signal 10 undergo in-phase additions at instants of time later in the cycle. Therefore, the local oscillator response in the output indicates the beginning of a spectral scan. The output of the voltage gate can be used to trigger the horizontal deflection circuits of the cathode ray tube 18, while the vertical deflection is activated directly by the output signal. The resultant display on the face of the cathode ray tube is a picture of one cycle of the output signal repeated at a repetition rate of $1/T$ cycles per second.

Since the local oscillator response pulse is generated in the same manner as the input signal spectrum, variations in the parameters of the loop components 5–8 have the same effect upon both the local oscillator and input signals. Therefore, the local oscillator response is inherently synchronous with the input signal spectrum and no external adjustments or timing mechanisms are necessary to trigger the horizontal deflection of the cathode ray tube 18.

As discussed above, the peak in the response, FIG. 2, occurs at an instant which is a linear function of the frequency in the input signal 10. Therefore, since the frequency of the local oscillator 11 is known the frequency of the signals A, B, and C can be extrapolated from the display on the cathode ray tube 18. Again, since variations in the parameters of the loop components 5–8 effect the input signal spectrum and the local oscillator response in the same manner, the relative positions of the response peaks are unchanged and the cathode ray tube can be calibrated without the necessity of additional circuitry or meters.

With regard to the automatic gain control feature of the present invention, the local oscillator frequency was selected to be injected into the loop through the summer 7. Although this frequency of the oscillator 11 is a very convenient frequency available in the system, the local oscillator 11 need not be used to provide the automatic gain control of the loop. Any frequency within the band capabilities of the loop 5–8 may be used, provided the amplitude is strong enough to result in a response exceeding the voltage gate threshold. The automatic gain control of the loop can be effected without regard to the position of the injected signal response in the spectral scan.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An automatic gain control circuit for a spectrum analyzer comprising:
   generating means for generating a control signal having an amplitude greater than the amplitudes of frequency components in a signal to be analyzed;
   a signal circulating loop including in series relationship a delay line element, a heterodyning circuit, a variable gain amplifier, and summing circuit means for combining the signal to be analyzed and said control signal with signals circulating in said loop, said generating means connected to said summing circuit means for injecting said control signal into said circulating loop;
   gating means connected to said loop for passing signals circulating in said loop exceeding a predetermined threshold; and
   amplifier control means responsive to changes in the signals passing through said gating means for correcting the gain of said amplifier in a manner inverse to the change of said signals passing through said gate.

2. An automatic gain control circuit for a spectrum analyzer comprising:
   means for generating a control signal having an amplitude greater than the amplitudes of frequency components in a signal to be analyzed;
   a signal circulating loop including means for generating a signal having an envelope pattern which exhibits amplitude peaks in response to the frequency components of signals applied thereto, said loop including in series relationship a delay line element, a heterodyning circuit, a variable gain amplifier, and summing circuit means for combining the signal to be analyzed and said controlled signal with signals circulating in said loop;
   gating means connected to said loop for passing signals circulating in said loop exceeding a predetermined threshold, said threshold being set above the amplitude peaks generated in response to the frequency components in the signal to be analyzed, and below the amplitude peaks generated in response to said control signal; and
   amplifier control means responsive to changes in the signals passing through said gating means for correcting the gain of said amplifier in a manner inverse to the change of said signals passing through said gate.

3. An automatic gain control circuit for a spectrum analyzer comprising:
   a local oscillator for generating a local oscillator signal having a predetermined frequency and having an amplitude greater than the amplitudes of the frequency components in the signal to be analyzed;
   a signal circulating loop including means for generating a signal having an envelope pattern which exhibits amplitude peaks in response to the frequency components of signals applied thereto, said loop including in series relationship a delay line element having a time delay equal to one cycle of said predetermined frequency, a high sideband modulator operated in response to said local oscillator signal, a variable gain amplifier, and summing circuit means for combining the signal to be analyzed and said local oscillator signal with signals circulating in said loop;
   gating means connected to said loop for passing signals circulating in said loop exceeding a predetermined threshold, said threshold being set above the amplitude peaks generated in response to the frequency components of the signal to be analyzed, and below the amplitude peaks generated in response to said local oscillator signal; and
   amplifier control means responsive to changes in the signal passing through said gating means for correcting the gain of said amplifier in a manner inverse to the change of said signals passing through said gate.

4. An improved spectrum analyzer capable of synchronizing and calibrating a display device comprising:
   a local oscillator for generating a local oscillator signal having a predetermined frequency and having an amplitude greater than the amplitudes of frequency components in the signal to be analyzed;
   a signal circulating loop including means for generating a signal having an envelope pattern which exhibits amplitude peaks in response to the frequency components of signals applied thereto, said loop including in series relationship a delay line element having a time delay equal to one cycle of said predetermined frequency, a high sideband modulator operated in response to said local oscillator signal, and summing circuit means for combining the signal to be analyzed and said local oscillator signal with signals circulating in said loop;
   gating means connected to said loop for passing signals circulating in said loop exceeding a predetermined threshold, said threshold being set above the amplitude peaks generated in response to the frequency components in the signal to be analyzed, and below the amplitude peaks generated in response to said local oscillator signal; and
   means for applying the output of said gating means to said display device.

5. An improved spectrum analyzer having automatic gain control and capable of synchronizing and calibrating a display device comprising:
   a local oscillator for generating a local oscillator signal having a predetermined frequency and having an amplitude greater than the amplitudes of the frequency components of the signal to be analyzed;
   a signal circulating loop including means for generating a signal having an envelope pattern which exhibits amplitude peaks in response to the frequency of signals applied thereto, said loop including in series relationship a delay line element having time delay equal to one cycle of said predetermined frequency, a high sideband modulator operated in response to said local oscillator signal, a variable gain amplifier, and summing circuit means for combining the signal to be analyzed and the local oscillator signal with signals circulating in said loop;
   gating means connected to said loop for passing signals circulating in said loop exceeding a predetermined threshold, said threshold being set above the amplitude peaks generated in response to the frequency components in the signal to be analyzed, and below the amplitude peaks generated in response to the local oscillator signal;
   amplifier control means responsive to changes in the signals passing through said gating means for correcting the gain of said amplifier in a manner inverse to the change of said signals passing through said gate; and
   means for applying the output of said gating means to said display device.

6. An automatic gain control circuit for use in a spectrum analyzer in which a signal to be analyzed is circulated in a delay line loop to produce a signal having an envelope pattern which peaks at times linearly related to the component frequencies of the signal to be analyzed comprising:

a variable gain amplifier;

means for generating a control signal having an amplitude greater than the amplitudes of frequency components in the signal to be analyzed;

a circulating loop having in serial relationship said amplifier, a delay line element, and summing circuit means, said summing circuit means being operative to combine the signal to be analyzed and said control signal with signals circulating in said loop;

gating means operative to selectively pass the control signal circulating in said loop; and amplifier control means operative in response to changes in the amplitude of the control signal passed by said gating means to control the gain of said amplifier.

References Cited by the Examiner

UNITED STATES PATENTS

| | | | |
|---|---|---|---|
| 2,800,580 | 7/1957 | Davies. | |
| 2,841,704 | 7/1958 | Sunstein et al. | |
| 2,997,650 | 8/1961 | Applebaum | 324—77 |
| 3,013,209 | 12/1961 | Bickel et al. | 324—77 |
| 3,060,380 | 10/1962 | Howells et al. | 324—77 |

WALTER L. CARLSON, *Primary Examiner.*

A. E. RICHMOND, *Assistant Examiner.*